United States Patent
Narsude

(10) Patent No.: US 7,403,940 B2
(45) Date of Patent: Jul. 22, 2008

(54) OPTIMAL STORAGE AND RETRIEVAL OF XML DATA

(75) Inventor: Chetan Narsude, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 251 days.

(21) Appl. No.: 10/990,426

(22) Filed: Nov. 16, 2004

(65) Prior Publication Data

US 2006/0059184 A1 Mar. 16, 2006

Related U.S. Application Data

(60) Provisional application No. 60/605,927, filed on Aug. 31, 2004.

(51) Int. Cl.
*G06F 7/00* (2006.01)
(52) U.S. Cl. .......................................................... 707/3
(58) Field of Classification Search ................. 707/101, 707/1–7
See application file for complete search history.

(56) References Cited

U.S. PATENT DOCUMENTS

| | | | | |
|---|---|---|---|---|
| 5,167,011 A | * | 11/1992 | Priest | 706/62 |
| 2005/0050011 A1 | * | 3/2005 | Van Der Linden et al. | 707/3 |
| 2005/0091188 A1 | * | 4/2005 | Pal et al. | 707/1 |

* cited by examiner

*Primary Examiner*—Wilson Lee
(74) *Attorney, Agent, or Firm*—Morrison & Foerster LLP

(57) ABSTRACT

A document management system manages a large number of XML documents on an efficient and cost-effective basis. Storage requirements are reduced, because compressed versions of the XML documents, which are much smaller in size than the XML documents themselves, are used when processing queries. Processing requirements are reduced, because parsing is not a required step when processing queries. Instead of parsing, the query is processed by unpacking the compressed version of the document identified in the query, node by node until enough information has been decoded to satisfy the query. Processing speed is improved in two ways. First, unpacking as carried out according to the invention is a much faster process than parsing. Second, the entire document need not be unpacked.

7 Claims, 7 Drawing Sheets

FIG. 2

```
<company>
    <employees>
        <employee id="chetan">
            <name>Chetan Narsude</name>
            <type>Permanent fulltime</type>
            <dept>Yahoo! Finance</dept>
            <title>Engineering Manager I</title>
        </employee>
        <employee id="kekre">
            <name>Amol Kekre</name>
            <type>Permanent fulltime</type>
            <dept>Yahoo! Finance</dept>
            <title>Engineering Manager II</title>
        </employee>
    </employees>
</company>
```

FIG. 4

| |
|---|
| 0,1,0,0 |
| 8,2,0,0 |
| 18,4,1,0,27,0 |
| 30,1,0,0 |
| 7,0,0,1 |
| 35,1,0,0 |
| 22,0,0,1 |
| 40,1,0,0 |
| 41,0,0,1 |
| 45,1,0,0 |
| 56,0,0,1 |
| 18,4,1,0,27,78 |
| 30,1,0,0 |
| 84,0,0,1 |
| 35,1,0,0 |
| 22,0,0,1 |
| 40,1,0,0 |
| 41,0,0,1 |
| 45,1,0,0 |
| 95,0,0,1 |

OPTIMAL STORAGE AND RETRIEVAL OF XML DATA

This application claims the benefit of Provisional Patent Application No. 60/605,927, filed Aug. 31, 2004.

BACKGROUND OF THE INVENTION

1. Field of the Invention

The present invention relates generally to document management, and more particularly, to a method and system for optimally storing and retrieving documents having a hierarchical structure such as XML documents.

2. Description of the Related Art

Extensible Markup Language (XML) is a universally accepted format for representing structured data in textual form. The XML format embeds content within tags that express its structure. XML makes it possible for different tools, applications and repositories on a variety of platforms and middleware to meaningfully share data and to easily search for data that is embedded in the XML documents.

XML documents are typically managed using a database. When specific information from an XML document is desired, a query is issued. In response to the query, the XML document identified in the query is retrieved from the database and parsed, and the desired information is extracted from the parsed XML document. The parsed XML document is commonly known as an XML DOM (Document Object Model). When the number and size of the XML documents stored in the database is very large, the processing of the queries carried out as described above requires expensive storage and becomes computationally expensive.

SUMMARY OF THE INVENTION

The invention provides a document management system that manages a large number of XML documents or any other documents having a hierarchical structure on an efficient and cost-effective basis. Storage requirements are reduced, because compressed versions of such documents, which are much smaller in size than the documents themselves, are stored in a database that is accessed when processing queries. Processing requirements are reduced, because parsing is not a required step when processing queries. Instead of parsing, the query is processed by unpacking the compressed version of the document identified in the query node-by-node until enough information has been unpacked to satisfy the query. Processing speed is improved in two ways. First, unpacking as carried out according to the invention is a much faster process than parsing. Second, the entire document does not need to be unpacked.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a sample XML document;

FIG. 4 is a binary object converted from the XML DOM of FIG. 3;

DETAILED DESCRIPTION

Figure 1:
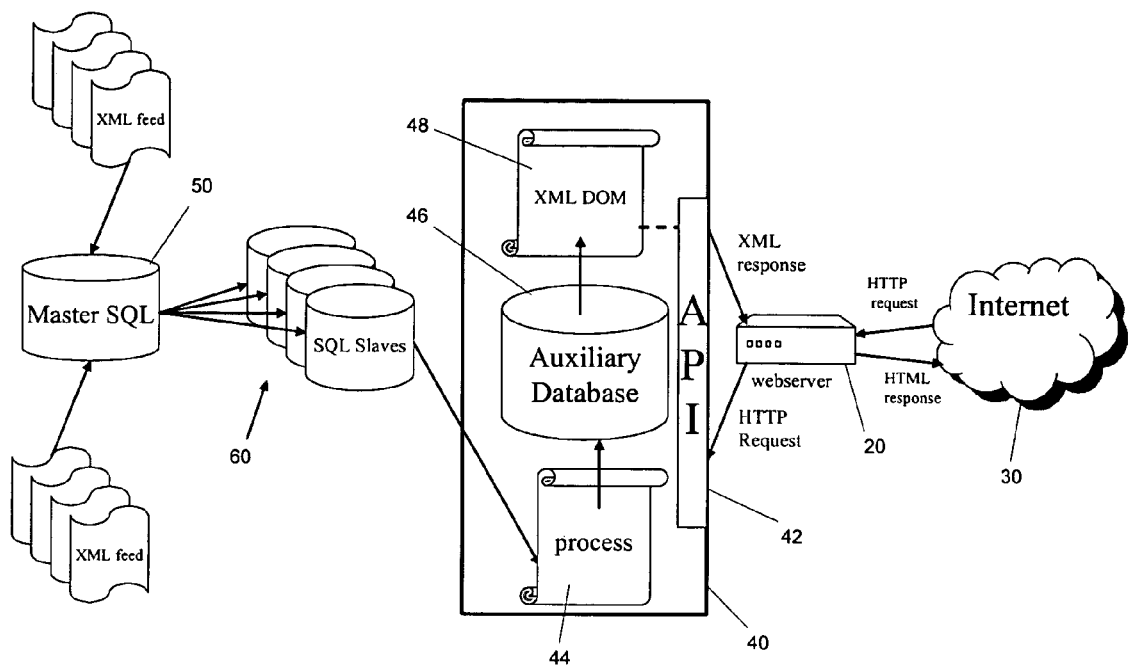
FIG. 1 illustrates a block diagram of a document management system that implements an embodiment of the invention.

FIG. 1 illustrates a block diagram of a document management system for XML documents. The document management system includes a web server 20 that receives HTTP requests made over the Internet 30 and transmits HTML documents in response to the HTTP requests. If the HTTP request includes a request for information in an XML document, the web server 20 passes on the HTTP request to an XML server 40. The XML server 40 receives the request, processes it and then transmits an XML response in return. The web server 20 creates the HTML response transmitted over the Internet 30 from the XML response received from the XML server 40 using XLST (Extensible Stylesheet Language Transformation).

The XML server 40 includes an application program interface (API) 42, a binary large object (BLOB) process 44, an auxiliary database 46, and a query process 48. The API 42 represents a set of routines, protocols, and tools used in converting the HTTP request into an XPATH query and in creating the XML response transmitted to the web server 20 based on the results of the query process 48. The BLOB process 44 converts XML documents into BLOBs and stores them in the auxiliary database 46. Each BLOB is stored in the auxiliary database 46 against a unique key, which is typically the title of the XML document that has been converted. The auxiliary database 46 can be any database that is capable of storing files against keys that are used as file identifiers. The query process 48 executes a query (e.g., an XPATH query) from the web server 20. It first retrieves a BLOB corresponding to the document identified in the query from the auxiliary database 46 and unpacks the BLOB to the extent necessary to process the query. Details of the BLOB process 44 and the query process 48 are set forth below.

The XML documents that are created or received from another document management system are stored in their original text form in an SQL database 50 and replicated in SQL slave databases 60. Any external entity or process (not shown), which wants to put one or more XML documents in the auxiliary database 46 may employ the BLOB process 44 to do so. First, the BLOB process 44 is initialized with an "hdinit" call. On successful initialization, the external entity or process calls the "hdprocess" for each document that is to be placed in the auxiliary database 46. The "hdprocess" is defined as:

int hdprocess(const char *path, const char *data, unsigned int size, unsigned int deletion).

The path argument refers to the key used to identify the document uniquely (e.g., the title of this document). The data contains the XML text representing the content of the document. The size argument is the length of this document in bytes and the deletion flag is set to a non-zero value when the document corresponding to path needs to be deleted from, instead of added to, the auxiliary database 46. The deletion flag is redundant since the size argument set to zero automatically means that the document needs to be deleted. After "hdprocess" is called for each document that is to be placed in the auxiliary database 46, "hdfini" is called to indicate completion of the operation.

The echo of the calls, "hdinit," "hdprocess," and "hdfini," is described below.

hdinit: This is the initialization method for the BLOB process 44. It first initializes a memory-mapped dictionary of words that is used by "hdprocess." This dictionary maps words appearing in XML documents to IDs that require much less memory. Because XML documents are very verbose and a lot of words in the document are repetitive, a lot of memory can be saved if, instead of storing the words, the associated IDs of the words are stored in the BLOBs. The "hdinit" method also initializes the underlying database (the auxiliary database 46 in FIG. 1), which is capable of storing any sequence of bytes as a key and any sequence of bytes as data associated with the key. In the embodiment illustrated in FIG. 1, Berkeley DB-4 may be used. Besides the above two subsystems, the "hdinit" method creates an instance of the object, hdprocess, that parses the XML document, removes unwanted white spaces, maps all the words appearing in the XML documents to the IDs in the dictionary, and creates the packed (compressed) BLOBs which are ready to be put in the database.

hdprocess: This is the method that generates the BLOB corresponding to the XML data and stores the BLOB in the database against the key represented by the path argument. In generating the BLOB, it parses the XML data in the data argument, identifies all unwanted white spaces usually appearing between the end of one element and the beginning of the next element, and maps all text appearing in the XML data to associated IDs in the dictionary. Any text, for which an ID has not already been assigned, is assigned a new ID during this process. These IDs are created in such a way that they are consistent across multiple processes. One simple way to achieve this is by getting the positional offset of the word from the beginning of the dictionary file. For parsing the XML document, any conventional parser may be used. In the embodiment of the invention illustrated herein, expat, which is a Simple API for XML (SAX), is used.

hdfini: This method does the exact opposite of the "hdinit" method. It closes the dictionary, flushes the database content from the memory to the disk and closes the database. Also, it releases the resources reserved by the parser that were used for parsing the XML document.

Figure 3:
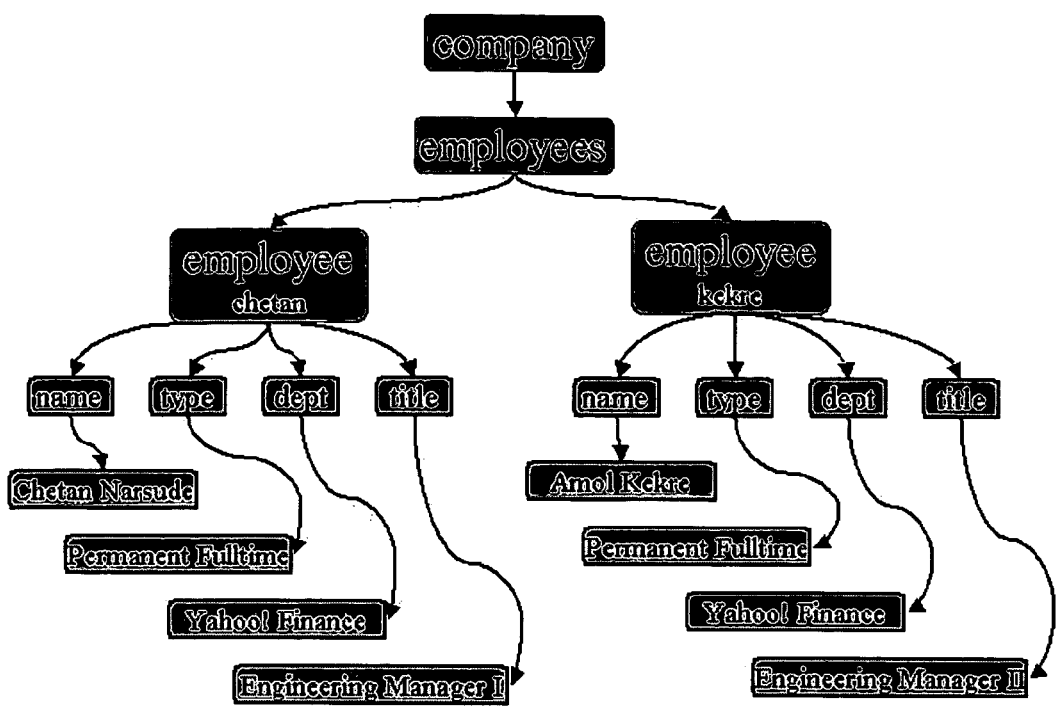
FIG. 3 is the XML DOM of the sample XML document of FIG. 2.

FIG. 2 is a sample XML document. After parsing, the XML DOM of the XML document in FIG. 2 may be graphically represented as shown in FIG. 3. The dictionary for the XML element nodes when built completely for the XML document in FIG. 2 is shown in the following table.

| Byte Offset (ID) | Word |
|---|---|
| 0 | company |
| 8 | employees |
| 18 | employee |
| 27 | id |
| 30 | name |
| 35 | type |
| 40 | dept |
| 45 | title |

The dictionary for the XML non-element nodes is shown in the following table.

| Byte Offset (ID) | Word |
|---|---|
| 0 | chetan |
| 7 | Chetan Narsude |
| 22 | Permanent Fulltime |
| 41 | Yahoo! Finance |
| 56 | Engineering Manager I |
| 78 | kekre |
| 84 | Amol Kekre |
| 95 | Engineering Manager II |

Each node in the BLOB, after "hdprocess" is performed on an XML document, is represented the following tuple:

| |
|---|
| int Root_Identifier |
| int Children_Count |
| int Attributes_Count |
| int NodeType | where Root_Identifier is the byte offset (ID) of the tag associated with the node; Children_Count is the number of child nodes; Attributes_Count is the number of attributes of the node; and NodeType is the node type, which may be:

const NodeType NodeElement=0 (for an element node);
const NodeType NodeText=1 (for a text node);
const NodeType NodeCData=2 (for a Cdata node);
const NodeType NodeComment=3 (for a comment node);
const NodeType NodeRaw=4 (for a raw data node);

If Attributes_Count>0, the tuple further comprises additional two byte offsets (IDs) for each attribute-value pair. The attribute is defined in the element node dictionary and the value is defined in the non-element node dictionary.

FIG. 4 illustrates the BLOB corresponding to the XML document in FIG. 2. The tuples shown in FIG. 4 are stored contiguously in memory for the auxiliary database 46, and are associated with the key for the XML document in FIG. 2.

Figure 5:
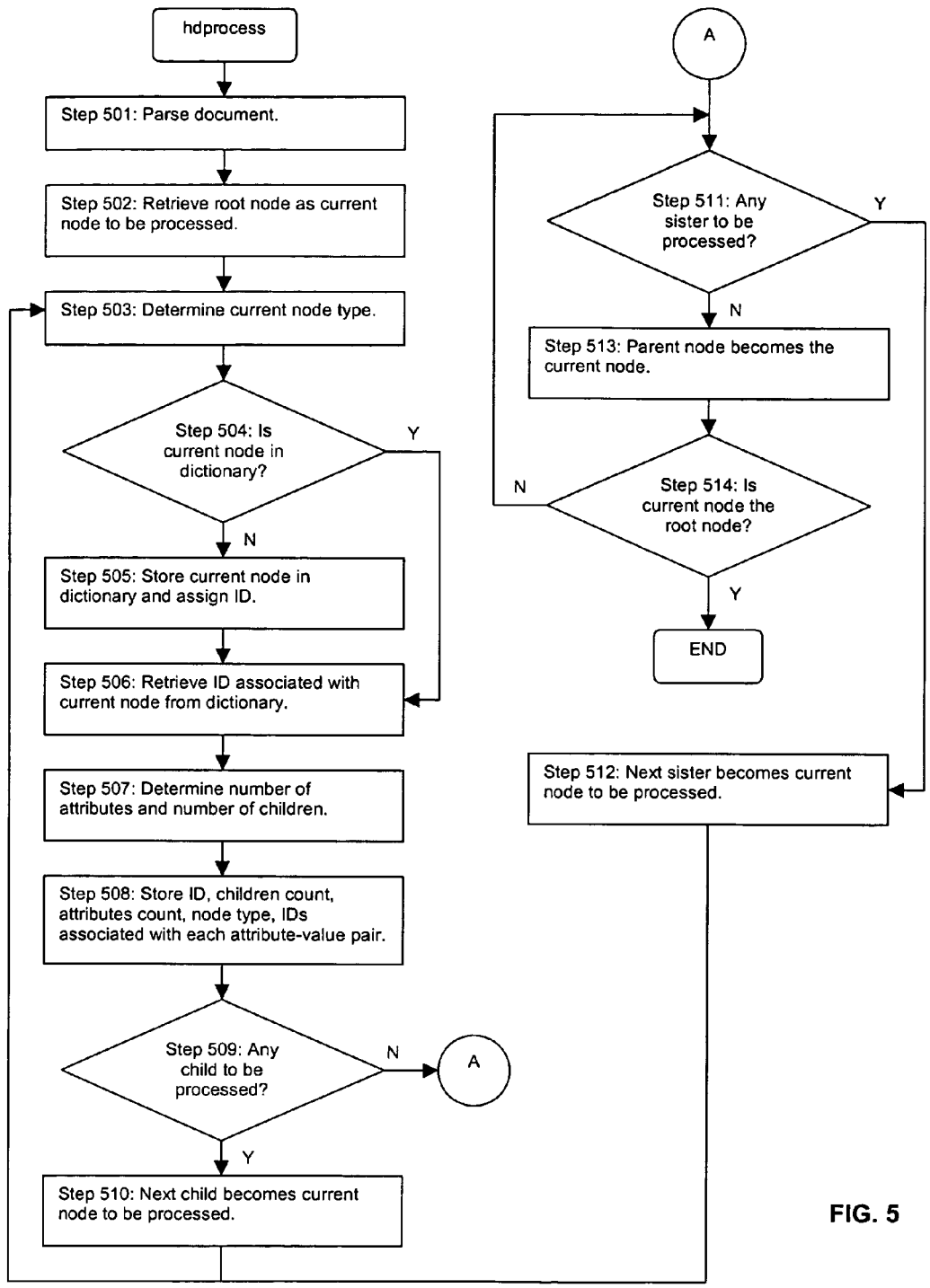
FIG. 5 is a flow diagram illustrating the steps of creating a binary object from an XML document.

FIG. 5 is a flow diagram illustrating the steps of creating a BLOB from an XML document. In Step 501, the XML document is parsed to generate the XML DOM of the XML document. Any conventional XML parser may be used. During parsing, white spaces (e.g., new line, tab and space characters) that appear before an opening element tag or after a closing element tag, but not between the tags, are removed. In Step 502, the root node of the XML document is retrieved as the current node for processing. In Step 503, the node type of the current node is determined.

In Step 504, the dictionary used with the "hdprocess" method is retrieved to see if the current node is stored as a term in the dictionary. If the node type is an element, then an element node dictionary is retrieved. If the node type is not an element, then a non-element node dictionary is retrieved. If the current node is not stored as a term in the dictionary, it is added to the dictionary and an ID is assigned (Step 505). The ID assigned corresponds to the positional offset (in bytes) in memory of the stored term with respect to the beginning of the dictionary. If the current node already appears in the dictionary, flow proceeds to Step 506, where the ID associated with the current node is retrieved.

In Step 507, the number of attributes and the number of children nodes corresponding to the current node are determined, and in Step 508, the ID, the children count, the attributes count, the node type, and all IDs associated with each attribute-value pair (if any) in the dictionary are stored. The dictionary used for the attributes and their associated values is the same as the dictionary used for the nodes, and the terms for attributes and/or values not found in the dictionary are created and assigned IDs in the same manner as for the nodes. The element node dictionary is used for the attributes and the non-element node dictionary is used for the values.

After the current node is processed, its children nodes are processed one-by-one in the same manner (Steps 509-510 and Steps 503-508). If there are no children nodes or all children nodes have been processed, the current node's sister nodes are processed one-by-one in the same manner (Steps 511-512 and Steps 503-508). If there are no sister nodes or all sister nodes have been processed, the parent node becomes the current node (Steps 513). If this node is not the root node (Step 514), any sister nodes of this node are processed one-by-one in the same manner as before (Steps 511-512 and Steps 503-508). The processing ends when the current node becomes the root node (Step 514).

Figure 6:
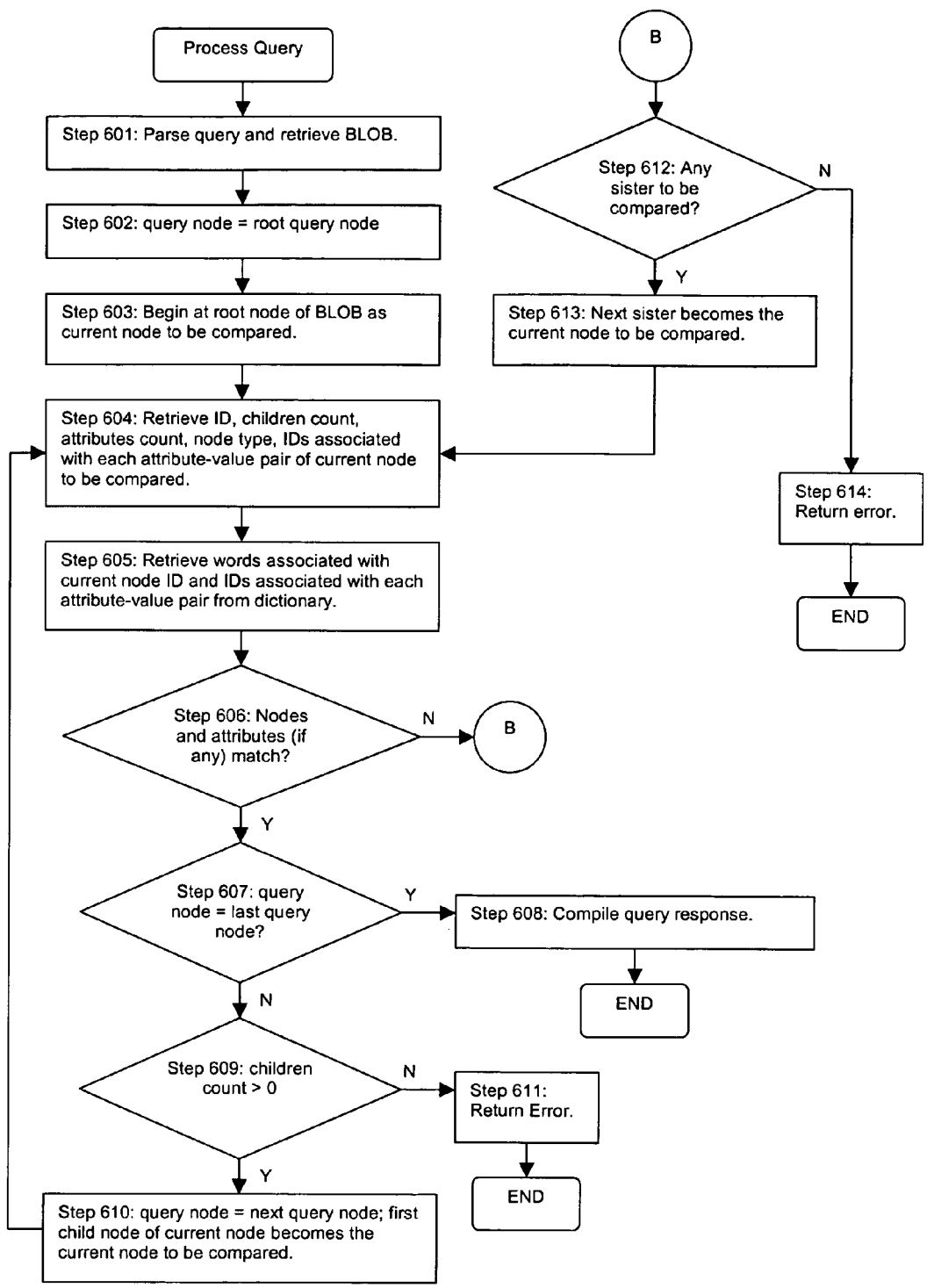
FIG. 6 is a flow diagram illustrating the steps for processing a query in which the child nodes of the XML document are processed in series.

FIG. 6 is a flow diagram illustrating the steps for processing a query, e.g., an XPATH query. In Step 601, the query is parsed and the BLOB corresponding to the document identified in the query is retrieved from the auxiliary database 46. In Step 602, the root query node is set as the query node, and in Step 603, the root node of the retrieved BLOB is set as the current node to be compared to the query node. In Step 604, the ID, the children count, the attributes count, the node type, and the IDs associated with any attribute-value pair of the current node are retrieved. In Step 605, the words associated with the current node's ID and the IDs associated with each attribute-value pair are retrieved from the dictionary. If the node type of the current node is element (or the ID is an attribute ID), the element node dictionary is used. If the node type of the current node is not an element (or the ID is a value ID), the non-element node dictionary is used.

In Step 606, the retrieved word and the query node are compared, and also any attributes defined in the query node are compared with the corresponding attributes defined in the current node. If there is a match in Step 606 and there are no more query nodes (Step 607), the query response is compiled (Step 608) and the process ends. The compiling of the query response typically involves unpacking of all nodes that originate from the last query node. For example, for the query, /company/employees/employee[@id='chetan'], the following portion of the XML DOM is compiled as the query response:

<employee id="chetan"><name>Chetan Narsude</name><type>Permanent Fulltime</type><dept>Yahoo! Finance</dept><title>Engineering Manager I</title></employee>

If the there are additional query nodes, flow proceeds to the decision block in Step 609. If children count>0, the next query node becomes the (current) query node and the first child node of the current node becomes the current node to be compared (Step 610), and flow returns to Step 604. If children count is 0, the query cannot be processed and an error is returned (Step 611).

If, in the decision block of Step 606, there is no match in the comparisons made, flow proceeds to Step 612, to determine if any of the current node's sister nodes matches the query node and any attributes of the query node. If the current node has sister nodes then the next sister node becomes the current node to be compared (Step 613) and flow proceeds to Step 604. If there are no sister nodes to the current node or all sister nodes have been processed for comparison, an error is returned in Step 614.

Figure 7:
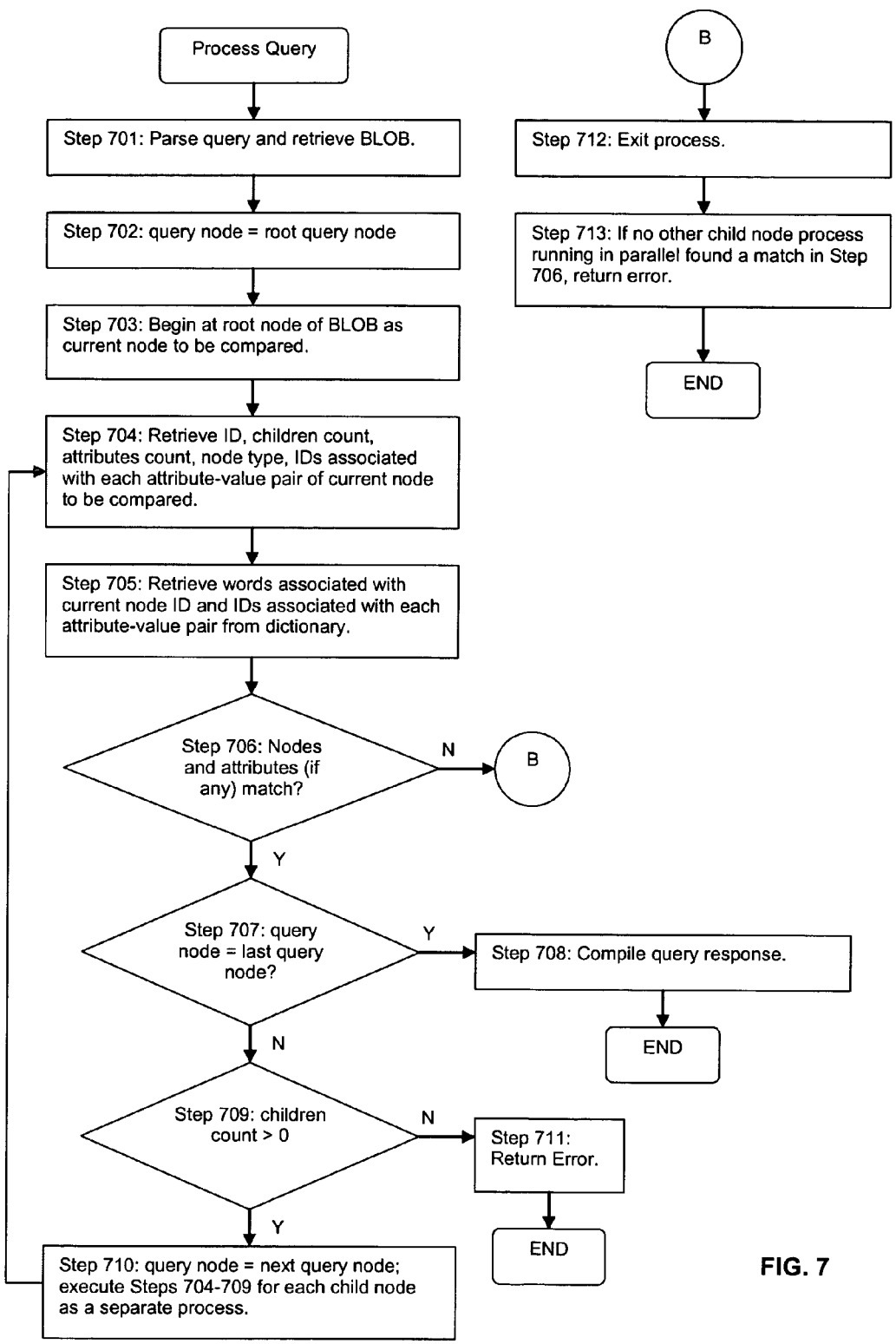
FIG. 7 is a flow diagram illustrating the steps for processing a query in which the child nodes of the XML document are processed in parallel.

Alternatively, the child nodes may be processed in parallel instead of in series as described in connection with FIG. 6. The parallel processing of the child nodes is illustrated in FIG. 7.

In Step 701, the query is parsed and the BLOB corresponding to the document identified in the query is retrieved from the auxiliary database 46. In Step 702, the root query node is set as the query node, and in Step 703, the root node of the retrieved BLOB is set as the current node to be compared to the query node. In Step 704, the ID, the children count, the attributes count, the node type, and the IDs associated with any attribute-value pair of the current node are retrieved. In Step 705, the words associated with the current node's ID and the IDs associated with each attribute-value pair are retrieved from the dictionary. If the node type of the current node is element (or the ID is an attribute ID), the element node dictionary is used. If the node type of the current node is not an element (or the ID is a value ID), the non-element node dictionary is used.

In Step 706, the retrieved word and the query node are compared, and also any attributes defined in the query node are compared with the corresponding attributes defined in the current node. If there is a match in Step 706 and there are no more query nodes (Step 707), the query response is compiled (Step 708) and the process ends. The compiling of the query response typically involves unpacking of all nodes that originate from the last query node. For example, for the query, /company/employees/employee[@id='chetan'], the following portion of the XML DOM is compiled as the query response:

<employee id="chetan"><name>Chetan Narsude</name><type>Permanent Fulltime</type><dept>Yahoo! Finance</dept><title>Engineering Manager I</title></employee>

If the there are additional query nodes, flow proceeds to the decision block in Step 709. In Step 710, if children count>0, the next query node becomes the (current) query node and Steps 704-709 are executed as a separate process for each child node. If children count is 0, the query cannot be processed and an error is returned (Step 711).

If, in the decision block of Step 706, there is no match in the comparisons made, flow proceeds to Step 712 where the process is exited. If none of the other child node processes that are running in parallel with the child node process that exited in Step 712 found a match in Step 706 or if there is no other child node process, an error is returned (Step 713).

Applications, which need to use the XML document, make a call against the auxiliary database 46 with the key corresponding to that document. The auxiliary database 46 returns the BLOB corresponding to the XML document, which was originally packed to be stored against the key with the "hdprocess" method. This BLOB is wrapped with a class called HDDomObject. HDDomObject interprets the bytes associated with the root node of the BLOB. If there is a query made against it, it first validates that the root node matches the first node of the query. If the root node matches the first node of the query, then it creates an HDDomObject for each of its children nodes and delegates the query to each child with corresponding part of the BLOB. Each child now behaves as if it was the root node for the BLOB passed to it and recursively tries to resolve the query. The HDDomObject class objects are constructed on the stack so they are very fast compared to creating the objects on the heap. In many cases, the search query narrows down as the XML DOM tree is traversed downwardly and so the unpacking is done only for a fraction of the BLOB, thereby speeding up the application.

Furthermore, once the BLOB is taken from the auxiliary database 46, it is reference counted. Reference count on the BLOB is incremented for each HDDomObject that is created. As a result, HDDomObject does not have to worry about memory management, which becomes messy as the tree grows. When the last XML DOM node goes out of scope, the object which reference counts the BLOB automatically frees it.

In summary, the features of the invention as applied to an XML document management system are as follows:

- The invention works with different types of databases so it can take advantage of the best of databases available. The auxiliary database 46 simply stores the BLOBs representing the XML documents against a key, which usually is title of the document.
- White spaces appearing inside text tags are preserved but the others are removed during the BLOB process 44, thereby saving on the byte processing and bandwidth.
- The entire XML or the valid XML fragments may be retrieved quickly using XPATH.
- The invention provides for optimal unpacking of the data (i.e., the entire XML DOM need not be unpacked from the BLOB), thus boosting the performance of the application.
- Reference counted memory management for the BLOB so that applications do not need to manage the memory.
- Most frequently accessed elements are cached in the memory as a result of using the dictionary, and this speeds up the access.
- A different dictionary can be plugged in thus changing the elements consistently across all of the XML documents on the fly. For example, the language of the XML documents can be easily changed by translating the words in the dictionary to the desired language.

While the foregoing is directed to embodiments of the present invention, other and further embodiments of the invention may be devised without departing from the basic scope thereof, and the scope thereof is determined by the claims that follow.

What is claimed is:

1. A method of managing documents having a hierarchical structure for responding to a query, the method comprising:
   maintaining at least two dictionaries of terms, each dictionary associated with an identified type of node including corresponding terms in the documents, each term having a unique value associated therewith in the dictionary;
   storing the documents as binary objects using values identifying the corresponding dictionary according to the identified type of node and the unique values for each term; and
   generating a query result using the binary objects and at least one of the at least two dictionaries.

2. The method according to claim 1, wherein storing includes parsing the documents and converting the parsed documents into binary objects.

3. The method according to claim 2, wherein the parsed documents include nodes of at least two types, and wherein a first dictionary of terms comprises terms corresponding to a node of a first type and a second dictionary of terms comprises terms corresponding to a node of a second type.

4. The method according to claim 3, wherein the documents are XML documents, and the node of the first type are element nodes and the node of the second type are data nodes.

5. The method according to claim 1, wherein a term that appears multiple instances in the documents appears only once in the dictionary.

6. The method according to claim 1, wherein the binary objects are stored in a database with keys that identify the documents.

7. The method according to claim 6, further comprising:
   receiving a query; and
   retrieving a binary object associated with a document identified in the query from the database for generating the query result.

* * * * *